United States Patent [19]

Adelski et al.

[11] 4,324,996
[45] Apr. 13, 1982

[54] INTERIOR ROTOR FOR AN ELECTRIC MACHINE

[75] Inventors: Hans-Joachim Adelski, Salz; Wolfgang Volkrodt, Bad Neustadt, both of Fed. Rep. of Germany

[73] Assignee: Siemens Aktiengesellschaft, Berlin and Munich, Fed. Rep. of Germany

[21] Appl. No.: 167,118

[22] Filed: Jul. 9, 1980

[30] Foreign Application Priority Data

Jul. 11, 1979 [DE] Fed. Rep. of Germany ....... 2928011

[51] Int. Cl.³ ............................................. H02K 21/12
[52] U.S. Cl. .................................... 310/156; 310/261
[58] Field of Search ....................... 310/152, 186, 261

[56] References Cited

U.S. PATENT DOCUMENTS

| 3,492,520 | 1/1970 | Yates | 310/156 X |
| 3,900,749 | 8/1970 | Carriker | 310/156 |
| 3,979,821 | 9/1976 | Noodleman | 310/156 X |
| 4,127,786 | 11/1978 | Volkrodt | 310/156 |
| 4,144,469 | 3/1979 | Miyashita et al. | 310/156 |

FOREIGN PATENT DOCUMENTS 1488733 6/1969 Fed. Rep. of Germany .
7726439 1/1979 Fed. Rep. of Germany .

Primary Examiner—Donovan F. Duggan
Attorney, Agent, or Firm—Spellman, Joel and Pelton

[57] ABSTRACT

The bipolar permanent field interior rotor for an electric machine comprises a multi-sided shaft which can be rotated about an axis of rotation, a multitude of sheet metal disks disposed on the multi-sided shaft, and a number of permanent magnet slabs. Each disk has a central hole formed by central edges and consists of at least two segments. The number of magnet slabs is smaller than the number of shaft sides. The magnet slabs directly engage respectively the sides of the shaft. The remainder of the shaft sides are engaged by central edges of the disks. The axes of magnetization of the slabs are arranged radially with respect to the axis of rotation of the shaft.

7 Claims, 1 Drawing Figure

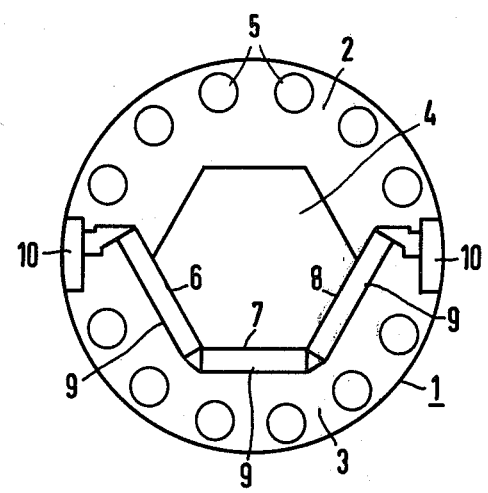

INTERIOR ROTOR FOR AN ELECTRIC MACHINE

BACKGROUND OF THE INVENTION

1. Field of the Invention

This invention relates to an interior rotor for an electric machine. In particular, this invention relates to a bipolar permanent magnetic field exited interior rotor for an electric machine. More particularly, this invention relates to an interior rotor for an electric machine having sheet metal segments disposed on a shaft, the shaft being shaped many-sided (as opposed to round) at least in that area where the segments are disposed thereon.

2. Description of the Prior Art

German utility model No. 77 26 439 discloses a bipolar permanent-field interior rotor for an electric machine in which a shaft is used the middle section of which is shaped many-sided. The magnetic poles of the rotor are formed by sheet metal segments which are arranged on the many-sided section of the shaft. Between the segments and the shaft are inserted permanent magnet slabs which abut the sides of the shaft. The axes of magnetization of the magnet slabs are arranged radially with regard to the axis of rotation.

In the previously known interior rotor a shaft having six sides is used. Each side of the shaft is covered by one of the permanent magnet slabs. In other words, the number of permanent magnet slabs equals the number of sides of the shaft.

In case that there shall be used rare earth magnets (containing elements of the lathanide series) for the permanent magnet slabs in such a rotor, the following problem will arise.

Because of the good magnetic properties of the rare earth magnets only a relatively small magnet volume is required for the generation of a sufficiently strong magnetic field. The magnetic slabs, therefore, can be designed to be thin, for instance, 2 mm. Due to the brittleness of the rare earth magnets, however, and in order to obtain sufficient mechanical strength or stability, the thickness should not be less than a certain minimum value, for instance, 3 to 4 mm. By virtue of this greater thickness of the magnets, an improvement of the magnetic conditions of the electric machine cannot be obtained. On the contrary, expensive magnetic material will be used without any effect.

SUMMARY OF THE INVENTION

Objects

It is an object of this invention to provide a permanent field excited interior rotor for an electric machine which provides a sufficiently large magnetic field by application of only few permanent magnets.

It is another object of this invention to provide a permanent field excited interior rotor for an electric machine which contains permanent magnets the thickness of which may be selected great enough to overcome or compensate for their brittleness, while any magnet volume which would be superfluous with regard to the magnetic requirements of the machine must not be provided.

It is still another object of this invention to provide a permanent field excited interior rotor for an electric machine in which rare earth magnets can be used the total volume of which can be kept comparatively small.

It is still another object of this invention to provide a bipolar permanent field excited interior rotor for a synchronous motor which is of small size, but of large power.

Summary

According to this invention, a bipolar permanent magnetic field interior rotor for an electric machine contains a many-sided shaft, a plurality of parallel sheet metal disks containing segments for forming magnetic poles, and a number of permanent magnetic slabs. The disk has a certain number of central edges, and the shaft has a given number of sides, for instance, 6. The sheet metal segments are disposed on the shaft. The number of permanent magnetic slabs is smaller than the given number of sides of the shaft. The magnetic slabs are inserted between only some sides of the shaft and the segments. At the remaining sides of the shaft, the sheet metal segments abut directly the shaft. The axes of magnetization of the slabs are arranged radially with respect to the axis of rotation of the shaft.

In other words, according to the invention, the shaft is completely enclosed by and in close contact with some of the central edges of each segment and with the magnet slabs.

Since only a part of the total surface of the shaft is covered by the permanent magnet slabs, the slabs must be designed by well known criteria so as to have a sufficient thickness to obtain the required magnetic volume. Therefore, the thickness of the permanent magnetic slabs can be chosen in accordance with the mechanical requirements. In spite of the greater thickness, the total magnetic volume will be proportioned only according to the electric requirements of the machine.

A specially favorable mechanical design of the internal rotor will be achieved if a shaft is used which has an even number of sides. In this case, the permanent magnet slabs will be inserted only between each of one half of the shaft sides and the sheet metal segments.

The foregoing and other objects, features and advantages of the invention will be apparent from the following more particular description of a preferred embodiment of the invention, as illustrated in the accompanying drawing.

BRIEF DESCRIPTION OF THE DRAWING

In the drawings:

The attached FIGURE shows the cross-section of a bi-polar interior rotor of a synchronous motor.

DESCRIPTION OF THE PREFERRED EMBODIMENT

With reference to the drawing, the cross-section of a bi-polar interior rotor 1 of a synchronous motor is illustrated. The interior rotor 1 has a stack of parallel disks one of which is shown in the drawing. Each disk contains a central hole having central edges and comprises two laminations or sheet metal segments 2 and 3, respectively. The segments 2 and 3 of each disk are punched in one piece. The rotor 1 further contains a magnetic shaft 4, at least a section of which is shaped multi-sided, here having six sides. The sheet segments 2 and 3 are disposed centrally on the shaft 4. In the rim of the sheet metal segments 2 and 3, there are provided holes 5 for the conductor bars of a squirrel cage.

Three sides of the shaft 4 are designated by 6, 7 and 8, respectively. These three sides 6, 7 and 8 are located next to each other. Three permanent magnetic slabs 9 are inserted between the central edge of the sheet metal segment 3 and the sides 6, 7 and 8 of the shaft 4. The magnetic slabs 9 directly engage the sides 6, 7 and 8, respectively. The magnet slab 9 which is arranged in the middle between the two other slabs, has a width which equals the width of each of the sides 6, 7 and 8, whereas the two side slabs 9 have a greater width. The magnet slabs 9 are rare earth magnets, that is they contain an element or elements of the lanthanide series. The magnetic slabs 9 each have an axis of magnetization which is arranged radially with regard to the axis of rotation of the shaft 4. The axis of rotation is located perpendicularly to the plane of the present drawing. As can be seen in the drawing, the other sheet metal segment 2 directly engages the three other sides of the shaft 4.

In order to avoid a magnetic short circuit between the segments 2 and 3, a non-magnetic material as is well known is inserted into the separation area 10 between the two sheet metal segments 2 and 3. This material connects the two sheet metal segments 2 and 3 mechanically.

As can be seen, the shaft 4 is completely enclosed by and directly contacted by the first segment 2 on three sides and by the three magnet slabs 9 on the other three sides 6, 7 and 8.

As mentioned above, each of the three sides 6 to 8 of the six-sided shaft 4 is covered with one of the three permanent magnet slabs 9. Therefore, it is possible to design these three permanent magnet slabs 9 with a greater thickness without exceeding thereby the magnet volume necessary for the electrical requirements of the machine. Thus, the permanent magnet slabs 9 have at least the minimum thickness which is mandatory for their mechanical strength or stability.

There has thus been shown and described a novel bi-polar permanent field interior rotor for an electric machine which fulfills all the objects and advantages sought therefore. Many changes, modifications, variations and other uses and applications of the subject invention, will, however, become apparent to those skilled in the art after considering the specification and the accompanying drawing which disclose a preferred embodiment thereof. All such changes, modifications variations and other uses and applications which do not depart from the spirit and scope of the invention are deemed to be covered by the invention which is limited only by the claims which follow.

What is claimed is:

1. A bipolar permanent field interior rotor for an electric machine, comprising in combination:
   (a) a shaft having an axis of rotation and at least one multi-sided section;
   (b) a sheet metal disk for forming magnetic poles of said rotor, said disk having central edges and at least two segments and being disposed on said multi-sided section of said shaft; and
   (c) a number of permanent magnet slabs each having an axis of magnetization, said number being less than the number of shaft sides, said magnet slabs being inserted between a number of central edges of said disk and said shaft such that said magnet slabs directly abut respectively a number of shaft sides and said central edges directly abut said magnet slabs and the remainder of said shaft sides, whereby said axes of magnetization are arranged radially with respect to said axis of rotation.

2. The rotor according to claim 1, wherein the number of shaft sides is even, and wherein said permanent magnet slabs are inserted only between half of said shaft sides and said central edges of said sheet metal disk.

3. The rotor according to claim 2, wherein said magnet slabs are positioned at adjacent shaft sides.

4. The rotor according to claim 1, wherein said sheet metal disk is formed of two segments, and wherein each of said segments is punched as one piece.

5. The rotor according to claim 1, wherein said permanent magnet slabs are magnets containing a rare earth.

6. The rotor according to claim 1, wherein said shaft section has six sides, wherein said sheet metal disk is divided into two segments, wherein three magnet slabs are arranged adjacent to three adjacent sides of said shaft, and wherein said three magnet slabs abut respectively the central edges of one of said two segments.

7. The rotor according to claim 6, wherein the width of one of said magnet slabs equals the width of its adjacent shaft side, and wherein the width of the remainder of said magnet slabs is greater than the width of their adjacent shaft sides.

* * * * *